No. 615,335. Patented Dec. 6, 1898.
P. YODER.
SALT PURIFIER.
(Application filed July 23, 1897.)
(No Model.) 2 Sheets—Sheet 1.
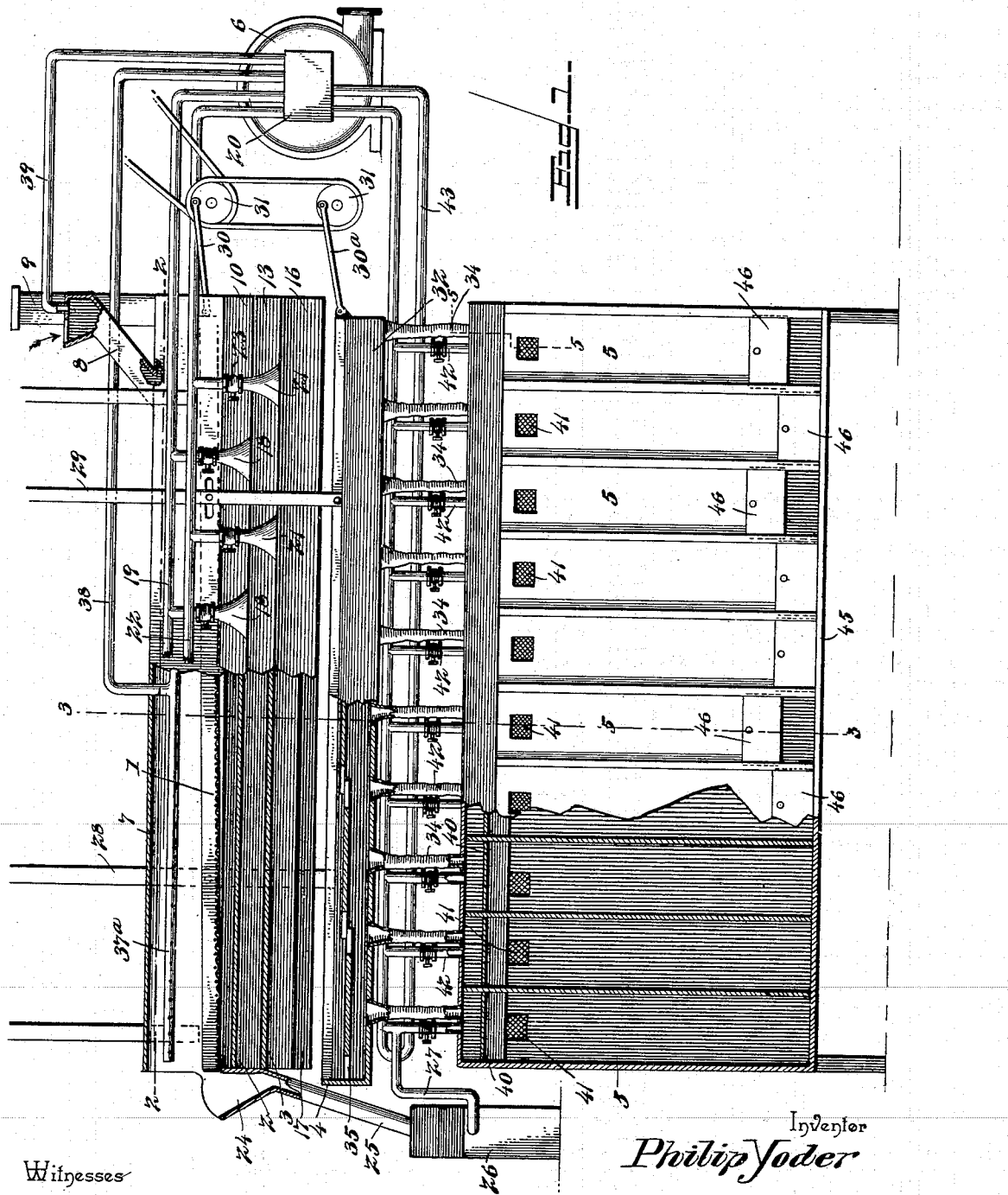
Witnesses
Inventor
Philip Yoder

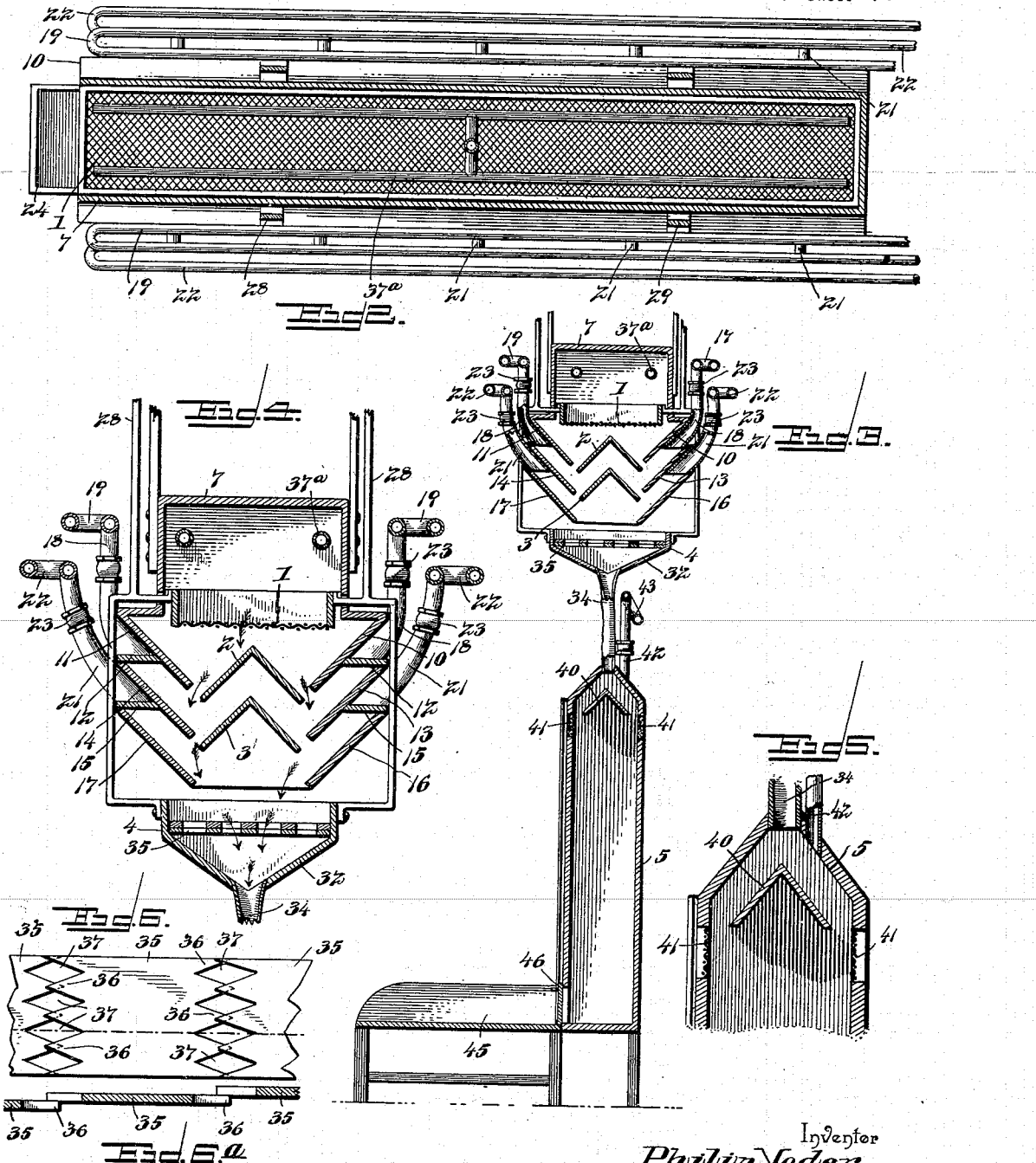

UNITED STATES PATENT OFFICE.

PHILIP YODER, OF WADSWORTH, OHIO.

SALT-PURIFIER.

SPECIFICATION forming part of Letters Patent No. 615,335, dated December 6, 1898.

Application filed July 23, 1897. Serial No. 645,680. (No model.)

*To all whom it may concern:*

Be it known that I, PHILIP YODER, a citizen of the United States, residing at Wadsworth, in the county of Medina and State of Ohio, have invented a new and useful Salt-Purifier, of which the following is a specification.

My invention relates to an apparatus for purifying, cooling, and separating salt after the same leaves the driers; and the object that I have in view is to provide for treating the heated salt in a manner to remove impurities therefrom and to thoroughly cool and dry the same, all in a continuous operation, thus enabling me to produce an improved quality of table or dairy salt which, after it shall have been packed in bags and ready for the market, is not liable to harden and cake.

It is well known to those skilled in the art that salt prepared for the table or for dairy use is liable to solidify into hard lumps or cakes, which sometimes require considerable force to break up and reduce to the proper granular condition. This is due to the fact that the salt contains impurities, chiefly lime, which will set and harden to cause the salt to form into lumps or cakes, and also to the fact that it is in a hot moist condition when it leaves the driers.

In my improved apparatus the salt is thoroughly cooled by mechanically carrying off at an early stage of the treatment a large percentage of the heat and moisture contained in the mass of salt as it leaves the driers. As this moisture and heat are eliminated from the mass of salt it is spread out into thin streams or sheets to better expose it to the action of air-currents, which traverse the sheets of salt in a reverse direction to the travel of the salt as it flows through the apparatus by gravity, and by thus subjecting the salt in the condition named to currents of air the lime compound and other impurities and the fine powdered particles of salt are eliminated and carried off to a dust-room, while the salt in a substantially pure condition is discharged into bins, from whence it may be drawn for the purpose of packing the same.

According to my invention the salt is subjected to the action of air-currents at two distinct stages of its treatment—first, immediately after or simultaneously with the elimination of heat and moisture therefrom, and, secondly, after the salt leaves the separator and as it is deposited in the storage-bins— whereby the salt is throughly aerated and cooled, and its impurities are eliminated before it is discharged into the storage-bins.

My apparatus is constructed to carry into effect the preparatory step of carrying off to a great extent the heat and moisture from the salt as it comes from the driers; secondly, subjecting the salt while in a thin spread or sheet-like condition to the action of a current of air, which traverses the salt in a direction the reverse of the course pursued by the salt, and, thirdly, agitating and distributing the salt to precipitate the same into storage-bins and again subjecting the salt while in its sheet-like condition to currents of pure fresh air, which also pass through the salt in a reverse direction in which it travels or falls by gravity into storage-bins.

The invention further consists in the combination, with a screen or sieve, of a spreader comprising breaks or baffles, upon which the salt is deposited after it emerges from or passes through the sieve or screen; a reciprocating agitator and distributer; storage-bins, and a suction-fan having connections with said screen or sieve, the breaks or baffles, and the storage-bins; and the invention consists, finally, in the novel combination of elements and in the construction and arrangement of parts, which will be hereinafter fully described and claimed.

To enable others to understand my invention, I have illustrated a preferred embodiment of the apparatus in the accompanying drawings, forming a part of this specification, and in which—

Figure 1 is a sectional elevation taken longitudinally through the apparatus. Fig. 2 is a horizontal sectional view on the plane indicated by the dotted line 2 2 of Fig. 1. Fig. 3 is a vertical transverse sectional elevation on the plane indicated by the dotted line 3 3 of Fig. 1. Fig. 4 is an enlarged sectional view through the screen and spreader. Fig. 5 is a detail sectional view through the storage-bin on the line 5 5 of Fig. 1. Figs. 6 and 6ª are detail views in plan and section, respectively, of the bottom of the agitator and distributer.

Like numerals of reference denote corresponding parts in all the figures of the drawings.

In my apparatus I employ a screen or sieve 1, a spreader embodying in its construction a series of breaks or baffles 2 3, an agitator and distributer 4, a series of storage-bins 5, and a suction-fan 6, which is operatively connected with the working parts of the apparatus to induce currents of air through the salt while the latter is spread out in sheet-like condition, the detailed construction and arrangement of which parts or elements I will now proceed to describe.

In the drawings I have shown the screen or sieve 1 as a reciprocating screen carried by a suitable framework and hung or suspended, as will presently appear, in a slightly-inclined position; but I do not restrict myself to the employment of a reciprocating or vibratory screen, because I am aware that a rotary screen or other equivalent device may be substituted for the reciprocating screen without departing from my invention. This screen 1 is contained within a suitable casing 7, and through this casing leads a chute 8, which conducts and deposits on the head of the screen the salt in a hot moist condition from the driers. The salt is conveyed from the driers by a suitable elevator, the boot or casing of which is indicated at 9, and from this casing or boot leads the chute 8.

Beneath the shaking sieve or screen 1 is arranged a spreader which serves to deflect the salt after it leaves the screen or sieve into tortuous channels or courses and to spread the same out into thin streams or sheets for the better passage of air through the salt and to effect its aeration, cooling, and drying to the best advantage. This spreader embraces as elements thereof the breaks or baffles 2 3, and the baffle 3 is arranged below the baffle 2, as shown by the drawings. Each baffle or break consists of two sides arranged at an angle to each other, with their apices situated at about the middle of the screen, and the baffles or breaks extend beneath the screen in the direction of the length thereof. Opposite to the upper baffle or break 2 are arranged the inclined deflectors 10 11, and these deflectors are situated in positions beneath the screen-casing to receive the salt as it passes through the screen, and they deposit the salt upon the inclined sides of the upper break or baffle 2. From the lower edges of the inclined deflectors 10 11 extend the horizontal ledges or walls 12 12, and from these horizontal walls 12 depend another set of inclined deflectors 13 14, the inclination of which is the reverse of that of the sides of the lower break or baffle 3. These deflectors 13 14 are arranged to extend by the lower edges of the sides of the upper break or baffle 2, and said deflectors are thus made to receive the salt after it leaves the baffle or break 2 and to deposit the salt upon the lower baffle 3. From the second set of deflectors 13 14 extend the second pair of horizontal walls or ledges 15 15, and from the outer edges of the walls 15 extend the inclined deflectors 16 17, which extend past the edges of the break or baffle 3 and serve to direct the salt inwardly toward the medial line of the separator, so that the salt which flows down the oppositely-inclined sides of the baffles or breaks and the oppositely-inclined sets of deflectors will be properly directed upon the agitator and distributer 4.

The inclined deflectors and horizontal walls or ledges hereinbefore described form elements or parts of the spreader which in its entirety consists of the breaks or baffles 2 3, the several inclined deflectors, and the horizontal ledges or walls, and, as will be seen, the baffles or breaks and the inclined deflectors provide within the spreader the tortuous channels through which the salt is adapted to fall by gravity.

The described arrangement of the baffles or breaks and the deflectors, which together form the spreader, is important in my apparatus, because such construction enables me to lead the salt in a tortuous course and to spread it out into thin streams or sheets, whereby the currents of air are able to traverse the salt to better advantage while in its sheet-like condition than would be possible if the salt was allowed to remain in a mass or bulky condition.

To the upper pair of horizontal walls 12 are connected the funnels 18, arranged in vertical positions and at suitable intervals along the walls or ledges 12 of the spreader. The enlarged or widened lower ends of these funnels are attached to the horizontal walls 12 to open into the space between the wall 12, the deflector 13, and the baffle 2, and the upper smaller ends of these funnels 18 are attached to one branch of a doubled pipe 19, both branches of which lead to and are connected with a drum or box 20, mounted on the side of the fan-casing 6. To the other pair of horizontal walls 15 are connected similar funnels 21, which open into or communicate with the space between the wall 15, the deflector 16, and the lower baffle or break 3, and these funnels 21 are attached to other return-pipes 22, both branches of each return-pipe 22 being connected with the drum or box 20 of the fan-casing. When the suction-fan is in motion, it draws air through the doubled or return pipes, the funnels, and through the tortuous passage formed by the breaks or baffles and the deflectors. The air is free to enter at the lower open side of the spreader formed by the breaks or baffles, the deflectors, and the screen or sieve, and the air pursues a tortuous course between the baffles and the deflectors. The salt falls or is precipitated by gravity upon the baffles and the deflectors; but the currents of air pass through the tortuous or irregular passage in the reverse direction to the salt, and as the salt is spread out in a thin sheet-like condition by the action of the breaks or baffles and the deflectors the air-currents may pass through the salt in a manner to carry with it any lime compounds, other impurities, and very fine particles of salt or salt-dust. The funnels are each provided with a suitable controlling-valve 23, by which the suction created by the fan 6 may be regulated. I attach importance to the employment of the funnels, which connect the suction-pipes with the irregular or tortuous salt-channels of the spreader, because the current of air lifts the salt upwardly into these funnels, and thus the finer particles of salt, or the dust, are separated from the coarser particles of salt. This enables the fine particle or dust to be carried off by the air-currents to the fan 6 and from thence blown into the dust-room, while the heavier particles of salt fall by gravity or are precipitated from the spreader onto the agitator or distributer 4. I also attach importance to the employment of the return or doubled pipes, each having both branches connected with the drum or box 20 of the fan and with the series of funnels connected to one branch of the pipe, because such construction enables me to secure a uniform draft or suction through the doubled pipe and the funnels which communicate with the irregular salt-channels through the spreader.

The coarse salt is retained on the top of the screen or sieve 1, and it is discharged therefrom in the form of tailings into a hopper-like mouth 24 of a chute 25, which leads to a reducing-mill 26, and to this mill-casing, at a point below its crushing mechanism, is connected a suction-pipe 27, which is connected operatively with the suction-fan 6, by which impurities and fine particles of salt from the mill are conducted to the suction-fan to be blown into the dust-room.

The agitator and distributer 4 is arranged beneath the spreader to receive the salt from the same, and this agitator and distributer is situated between the spreader and the storage-bins 5, so as to cool the salt contained thereon and to distribute it uniformly to the series of storage-bins. This agitator and distributer is hung or suspended to have a rectilinear or reciprocating motion, and in the embodiment of my invention shown by the drawings I have provided spring or elastic hangers 28 29, which serve to suspend both the agitator and distributer and the reciprocating screen 1. These hangers are shown as consisting of spring-bars suitably attached to the screen-frame and the distributer-frame, and to the screen-frame and the distributer-frame are connected links 30 30$^a$, driven by suitable crank-wheels 31, to which motion is imparted in any suitable way.

The agitator and distributer is provided on its lower side with inclined walls, forming a trough or hopper 32, from which leads a series of spouts 34, that pass downwardly into the storage-bins 5. The agitator and distributer has a bottom composed of a series of sections 35, arranged to overlap each other at their meeting ends, and the overlapping ends of these sections of the bottom are formed with a series of tongues 36, producing a series of spaces or notches 37. The bottom sections are arranged to have the tongues overlap at their meeting ends, so that the spaces register or aline with each other, and thus the bottom sections are arranged to provide a number or series of openings in the bottom of the distributer, through which openings the salt contained in the distributer may pass to the trough or hopper 32, from whence the salt is conducted by the spouts 34 to the storage-bins. The overlapping tongues at the ends of the sections of the bottom in the agitator and distributer form abutments or shoulders by which the salt is caught and carried with the distributer in its reciprocating motions, and thus the salt is agitated and cooled, while at the same time it is distributed or discharged in separate streams through the series of openings in the bottom of the distributer, whereby the salt may be distributed uniformly to all the series of storage-bins. The sections 35 of the bottom of the agitator and distributer may be slidably fitted in the frame or casing of said distributer, and said sections may thus be mounted for adjustment by hand to enable the sections to be moved toward or from each other for the purpose of varying the area of the openings in the distributer-bottom, thus regulating the flow or discharge of salt through the distributer.

The moisture and heat from the salt as it is conveyed from the driers to the casing of the screen or sieve are absorbed and carried off to a great extent by the provision of perforated off-bearing pipes 37$^a$, which are arranged or suspended within the screen-casing above the screen or sieve therein. These off-bearing pipes 37$^a$ for the heat and moisture are connected by the branch pipe 38 with the drum or box 20 of the suction-fan. A similar off-bearing pipe 39 is connected to the elevator head or casing 9 at about the place where the chute 8 leads from said head or casing, and this off-bearing pipe 39 is also connected to the box or drum 20 of the fan-casing. By the employment of these off-bearing pipes, connected with the suction-fan and arranged to carry off the heat and moisture at the initial introduction of the hot moist salt into the apparatus, I am enabled to eliminate a great percentage of the heat and moisture from the salt at the initial stage of its treatment and to place the salt in a condition which best fits or adapts it for the subsequent treatment it receives in the apparatus, thus facilitating the treatment.

After the salt has been purified and aerated by passing it through the purifier and cooled and distributed by the action of the reciprocating device 4 the salt is conducted to the storage-bins; but preliminary to being deposited in these bins the salt is further subjected to treatment by spreading it into thin streams or sheets and by passing currents of pure air through the salt on its way into the bins 5. To accomplish these ends, I provide each bin near the closed upper end thereof with a break or baffle 40, and in the sides or walls of each bin are the grated openings 41, which are arranged opposite to each other, while to the top of each bin is connected a suction-pipe 42. The baffle or break 40 is thus situated in a plane between the inlet and exhaust of air to and from the bin, and this break or baffle is arranged in a plane above the oppositely-disposed inlet-openings in the bin, whereby the thin stream or sheets of salt as it is conducted to the bin are exposed or subjected finally to currents of air which pass through the salt. The suction-pipes 42 from the series of bins 5 are all connected to a branch of a doubled pipe 43, both extremities of which are connected with the box or drum 20 of the fan-casing 6, and with this doubled pipe 43 is connected the suction-pipe 27 from the reducing-mill, as shown by Fig. 1.

It will be observed that all the suction-pipes leading to the various operating parts of my apparatus are all connected to the box or drum 20 of the fan. This employment of the drum or box 20 enables me to connect all the suction-pipes to a single common fan, and all the impurities in the salt, as well as the fine particles of salt or the salt dust, are thus adapted to be blown by a single device into the dust-room. (Not shown.)

Adjacent to the lower parts of the storage-bins is arranged an operating-table 45, at which all the workers may be seated to engage in the operation of bagging or packing the salt. Access is had to the storage-bins by means of a sliding gate or valve 46, by opening which the salt is free to flow from the bin upon the table.

The operation of the apparatus may be described, briefly, as follows: The salt from the driers is conveyed by the elevator to the chute 8, and in its hot moist condition the salt is deposited on the screen or sieve 1. The screen or sieve being reciprocated the salt passes through into the spreader, while the coarse salt is deposited as tailings into the chute that leads to the reducing-mill. As the salt passes through the spreader it is spread into thin streams or sheets and exposed to the action of currents of air, which are drawn through the funnels 18 21, and these currents of air hold the salt in suspension within the funnels for a short time, the heavier and coarser particles of salt being precipitated or falling by gravity through the purifier, while the lighter particles of salt or dust and the impurities are carried off to the fan, thus insuring a very delicate separation of the desirable granules of salt from the dust or extremely fine particles. The moisture and heat from the salt when first delivered to the apparatus is carried off to a large degree by the off-bearing pipes, which lead from the elevator-head and the screen-casing. The salt after leaving the spreader is deposited upon the distributer 4, where it is further cooled and agitated, so as to be discharged in a manner to enable it to be uniformly distributed to the storage-bins, and as the salt passes from the spouts of the distributer to the storage-bins it strikes the baffles or breaks 40 in said bins, to be again spread into sheet-like condition and again subjected to currents of air through the grated openings and the suction-pipes 42, thus carrying off any salt dust and impurities which may have escaped with the salt through the spreader and the distributer.

My process of treating salt by subjecting it to the aeration process at the initial and final steps of treatment enables me to eliminate all impurities and to thoroughly cool and dry the salt preliminary to depositing the salt into storage-bins. I have demonstrated that salt treated in accordance with my invention is of a purer quality in that the lime compounds and other objectionable matters are eliminated, and salt thus prepared will not become caked or hardened into lumps or masses. Salt prepared according to my invention is especially desirable for table use and for dairy purposes.

I am aware that changes in the form and proportion of parts and in the minor details of construction of the mechanisms herein shown and described as the preferred embodiment of my invention may be made by a skilled mechanic without departing from the spirit or sacrificing the advantages of my invention. I therefore reserve the right to make such modifications and alterations as fairly fall within the scope of my invention.

Having thus fully described my invention, what I claim as new, and desire to secure by Letters Patent, is—

1. In an apparatus for treating hot moist salt, the combination with a screen or sieve, of a spreader arranged horizontally beneath said screen or sieve and provided with tortuous or irregular channels, a series of vertical tapering funnels attached to said spreader and communicating with the tortuous channels therein, and means for creating an air-current through said funnels, whereby the funnels create currents of air through the spreader-channels and hold the salt in suspension, substantially as described.

2. In an apparatus for treating hot moist salt, the combination of a spreader constructed with tortuous or irregular channels for the passage of salt, a series of vertical tapering funnels communicating at intervals with the spreader, and a single suction-fan having pipe connections with all the funnels of the series, substantially as and for the purposes described.

3. In an apparatus for treating hot moist salt, the combination of a horizontally-arranged spreader provided with tortuous or irregular channels for the passage therethrough of salt and adapted to spread the latter in a sheet-like condition, a series of vertical tapering funnels having their broad lower ends communicating at intervals with the tortuous channels of the spreader, and a suction-fan operatively connected with the series of funnels, substantially as described.

4. In an apparatus for treating hot moist salt, the combination with the spreader, of a series of vertical storage-bins arranged below the spreader and each provided with a baffle and air-inlet openings, a reciprocating distributer suspended between the spreader and the series of bins and having an individual discharge-opening to each bin, and a suction-fan connected operatively with the spreader and the storage-bins, substantially as and for the purposes described.

5. In an apparatus for treating hot moist salt, a horizontal spreader comprising a series of brakes or baffles arranged one below the other, and a series of deflectors situated opposite to the baffles and forming therewith tortuous channels or passages, combined with a series of vertical tapering funnels communicating with the tortuous passages of the spreader, a suction-fan, and pipe connections between the funnels and said fan, substantially as described.

6. In an apparatus for treating hot moist salt, a spreader comprising a series of baffles arranged one below the other and a series of deflectors situated in inclined relation to the baffles and forming therewith tortuous channels or passages, said spreader having horizontal connecting-walls between the deflectors, combined with a series of funnels attached to the horizontal walls of the spreader and communicating with the tortuous channels thereof, a suction-fan, and pipe connections between the suction-fan and said funnels, substantially as described.

7. In an apparatus for treating hot moist salt, the combination of a spreader having tortuous channels, a series of funnels attached to said spreader to communicate with the channels thereof, a suction-fan and a double or return pipe having both extremities thereof connected with the suction-fan and attached at intervals throughout its length to the series of funnels, substantially as described.

8. In an apparatus for treating hot moist salt, the combination with a screen or sieve, a spreader arranged horizontally below said screen and provided with tortuous channels, a suction-fan, off-bearing perforated pipes arranged longitudinally above the screen or sieve and connected with the suction-fan, a series of funnels communicating with the channels of the spreader, and a pipe attached to said funnels and also connected with the suction-fan, substantially as described.

9. In an apparatus for treating hot moist salt, the combination with a spreader and a suction-fan, of a series of storage-bins situated below the spreader and each provided with air-inlet openings, a series of baffles within said storage-bins, means between the spreader and the storage-bins for distributing salt from the spreader uniformly to the bins, a suction-fan, and suction-pipes connected with the funnels of the spreader and with the individual storage-bins, substantially as and for the purposes described.

10. In an apparatus for treating hot moist salt, the combination with a spreader and a suction-fan, of a series of storage-bins each provided with a baffle and with an air-inlet port below said baffle, means between the spreader and the storage-bins for uniformly distributing salt from the spreader to said bins, a series of funnels attached to the spreader, a double or return pipe having its branches connected with the series of funnels and the suction-fan, another double or return pipe connected with the suction-fan, and branch pipes attached to the last-named return-pipe and independently connected to each of the bins at a point above the air-inlet opening and the baffle in said bin, substantially as described.

11. In an apparatus for treating hot moist salt, the combination with a spreader and a series of storage-bins, of a reciprocating distributer arranged horizontally between the bins and spreader and provided with a series of openings arranged over the storage-bins, and spouts connecting said spreader with the bins, substantially as and for the purposes described.

12. In an apparatus for treating hot moist salt, the combination with a spreader and the storage-bins, of a distributer provided with the sectional bottom, the members of which are notched and overlapped at their contiguous ends and arranged to form a plurality of series of openings, for the purposes described substantially as set forth.

In testimony that I claim the foregoing as my own I have hereto affixed my signature in the presence of two witnesses.

PHILIP YODER.

Witnesses:
W. F. SCHLABACH,
AARON PARDEE.